Dec. 25, 1951 R. F. BADGLEY ET AL 2,580,270

AUTOMATIC COMPARATOR FOR RECORDS

Filed Oct. 4, 1947 2 SHEETS—SHEET 1

INVENTORS.
Robert F. Badgley
William A. Wilken
Chester Tietig

AUTOMATIC COMPARATOR FOR RECORDS

Filed Oct. 4, 1947 2 SHEETS—SHEET 2

INVENTORS.
Robert F. Badgley
William A. Wilkin
Chester Tietig

Patented Dec. 25, 1951

2,580,270

UNITED STATES PATENT OFFICE 2,580,270

AUTOMATIC COMPARATOR FOR RECORDS

Robert F. Badgley, Wyoming, and William A. Wilken, Cincinnati, Ohio, and Chester Tietig, Covington, Ky.

Application October 4, 1947, Serial No. 777,888

5 Claims. (Cl. 88—24)

This invention relates to a method and automatic apparatus for selecting recorded information optically by the use of a record strip somewhat similar to a motion picture film, but carrying data in the form of groups of transparent dots, dashes or other small indicia. Arranged according to a prescribed pattern, these dots or indicia convey information by virtue of their relative position in a series of frames of the strip, each frame representing a given subject. When a selection is to be made, a master film is prepared having a group of dots or indicia arranged according to the prescribed pattern. This strip is installed in the apparatus and the record strip is caused to pass over it in superposed relationship. These superposed strips are disposed to intercept a beam of light trained upon a photoelectric cell so that a maximum degree of light passes through the strips when a predetermined proportion of dots of the record strip register with the master strip.

Ordinarily the beam of light is blocked because the pattern of apertures of the master and scanning film are not in registry. However, when the data of the master and record film coincide within a predetermined degree, the corresponding apertures of the respective films will be in registry thereby permitting passage of the light through the matching apertures to the photoelectric cell which causes the apparatus to record the registration of the two strips and so inform the operator.

Briefly stated, the concept of the invention is to provide a light sensitive apparatus by means which a continuous record strip may be matched with a master film or strip and by means of corresponding patterns of apertures formed in the respective strips, a light beam passes through those apertures which coincide to indicate the registration between the master and the record strips.

A principal object of the invention has been to provide an accurate and rapidly operating apparatus for comparing records based upon the degree of coincidence between apertures of a master record strip, which bears indicia of the characteristics sought and a scanning strip which bears indicia of the characteristics available.

A further object has been to provide an apparatus which will indicate not only exact duplication between the record strip and the master strip, but which also will indicate duplication within a preselected degree.

Still another object has been to provide an apparatus for selecting a record by means of a beam of light passing through apertures formed in the record strip in order to provide a simplified, flexible and automatically operated machine having a minimum of moving parts and providing a maximum degree of sensitivity.

Further objects and advantages of the invention will be more clearly set forth in the specification with reference to the accompanying drawing in which.

Figures 1, 2, 3, 4, 5, 6, 7, 19:
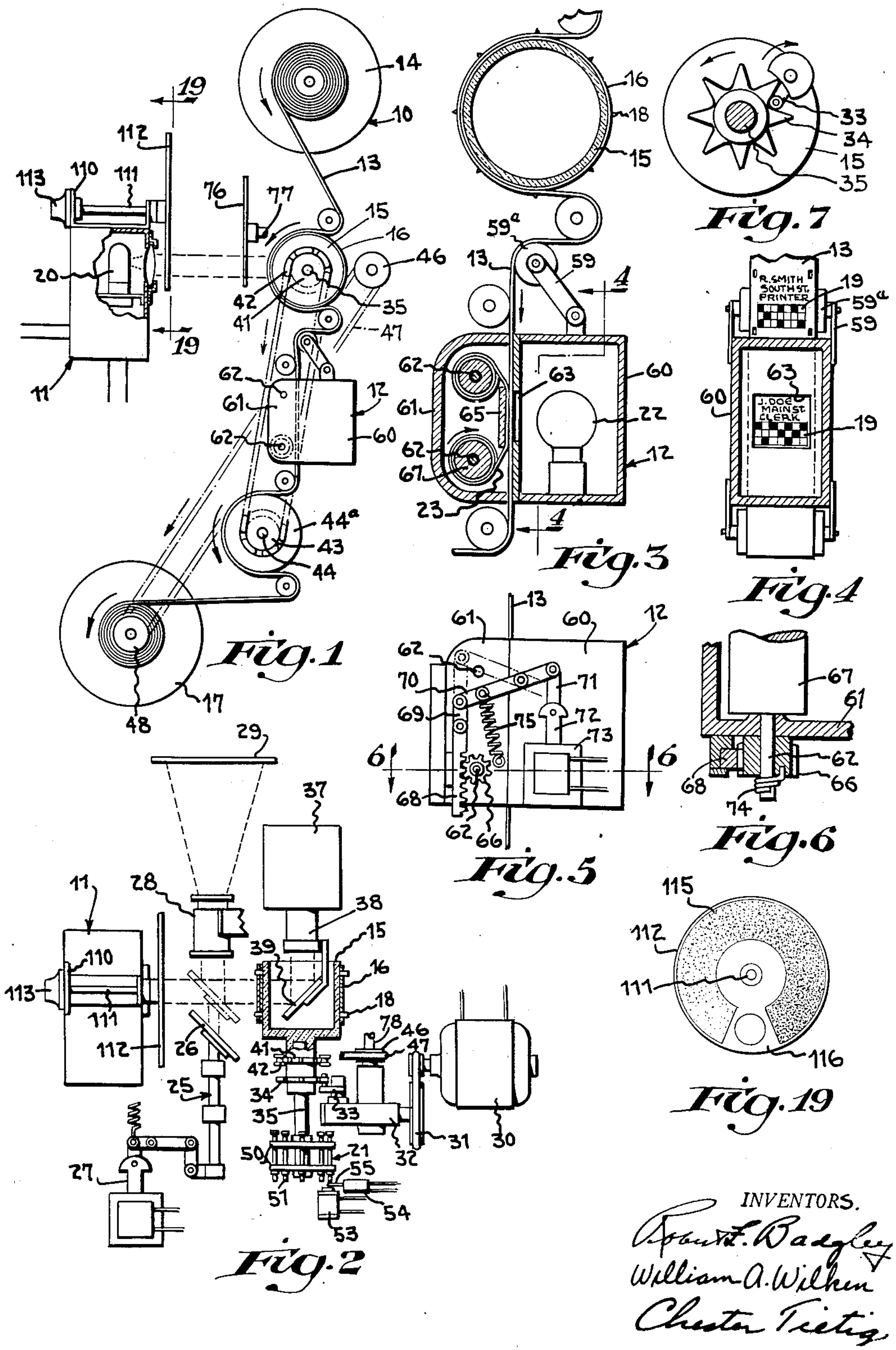
Figure 1 is a general schematic side view of the apparatus.
Figure 2 is a top plan view partially in section further illustrating the apparatus generally.
Figure 3 is a sectional view detailing on an enlarged scale the feed mechanism, the scanning drum and the photographic printing apparatus.
Figure 4 is a sectional view taken on line 4—4, Figure 3, further detailing in section the photographic printing apparatus.
Figure 5 is a side elevation illustrating the mechanism for feeding the sensitized paper for the photographic apparatus.
Figure 6 is a sectional view taken on line 6—6, Figure 5, detailing the over running clutch and rack and pinion connections for the lower feed roll of the sensitized paper feed apparatus.
Figure 7 is a side elevation detailing the intermittent feed gear for the scanning drum.
Figures 8, 9, 10, 11, 12, 13, 14, 15, 16, 17, 18:
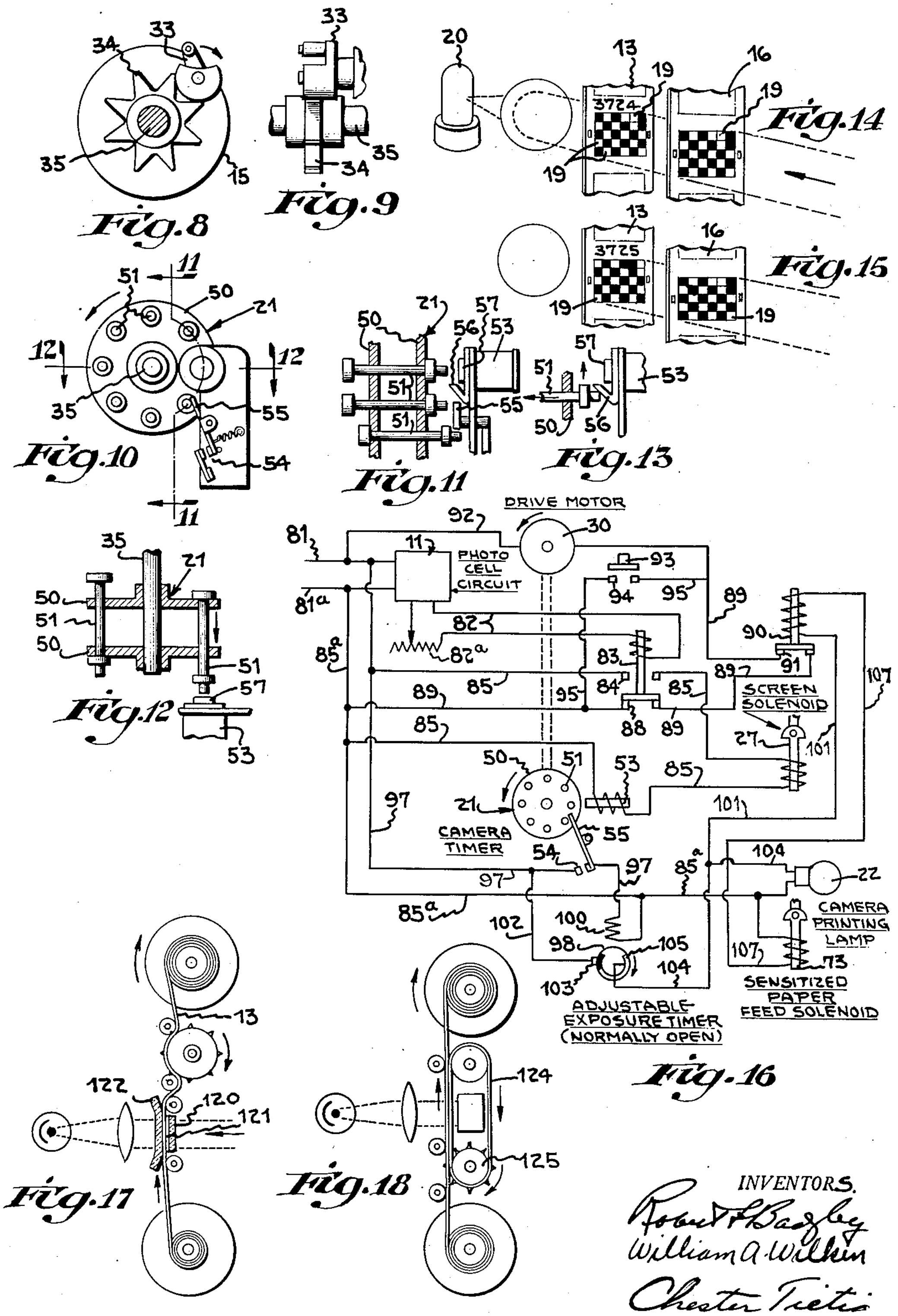
Figure 8 is a view similar to Figure 7 showing the feed mechanism during its stationary period or cycle.
Figure 9 is a sectionary side elevation projected from Figure 8, further illustrating the operation of the feed mechanism.
Figure 10 is an end view of the timer assembly.
Figure 11 is a sectional view taken on line 11—11, Figure 10, further detailing the timer mechanism.
Figure 12 is a sectional view taken on line 12—12, Figure 10, further detailing the operation of the timing apparatus.
Figure 13 is a fragmentary view illustrating the means for resetting the timer plungers.
Figure 14 is a diagrammatic perspective view illustrating the light beam with reference to a master film and record or data film exemplifying a condition of complete registration, in which the light beam passes through the apertures to the photo-electric cell to initiate the operation of the mechanisms.
Figure 15 is a diagrammatic view similar to Figure 14 showing a condition on non-registry between the master and data film with the light beam blocked.
Figure 16 is an electrical diagram showing the control circuit for the apparatus.
Figure 17 is a side view partially in section showing a modified form of scanning apparatus following the same general principles disclosed in Figure 1.
Figure 18 is similar to Figure 17 showing a further modification of the scanning apparatus.

Fig. 19 is a side elevation of a rotatable regulating disc of graduated transparency intended to be placed between the photocell shown in Fig. 14 and the records to be compared, which are also shown in that figure. The disc is also indicated by a circle as part of Fig. 15. Its function is to vary the intensity of light to be received by the photocell to regulate the triggering of the latter.

Based upon the concept of selecting information by the use of a continuous strip having frames similar to a motion picture film, the information may be printed in the form of apertures punched, photographed or otherwise arranged in a predetermined pattern. Each of the several apertures indicates a particular characteristic relative to the desired data. By way of example, the continuous strip may be utilized as a means for recording the qualifications of prospective employees. The respective frames of apertures of the record strip in this instance may be used to indicate the qualifications of each individual applicant. Thus, one particular row of apertures may indicate sex, another race, a third row may indicate the matter of education, and experience and general background information may be disclosed by other rows of apertures.

When an employee is required by the organization a master strip is prepared bearing a pattern of apertures indicating the qualifications required. The apertures of the master are arranged in the same pattern as the record strip with an equal and corresponding number of apertures or blocks. This master film or strip is then placed in the apparatus and the previously prepared record strip containing the qualifications of available applicants is run through the apparatus superposed upon the master strip. The strips pass over a scanning drum with the frames in registry and a beam of light is directed against the superposed film. Thus, the intensity of the light passing through the films is varied according to the number of matching apertures in the master and record film. If a predetermined number of apertures match, the light beam reaches a sufficient intensity to energize a photoelectric cell which in turn causes the matching frame to be flashed upon a screen to show the name or file number of the applicant. After this it may be passed through a recording camera in which the file data of the applicant is recorded on a photographic film strip for later reference.

Thus, the film to be matched or compared forms in effect, a file or record of available employees and may be made from a paper strip or a similar opaque material, or it may consist of a photographic film and the information may be photographed, first having been properly coded upon a card or sheet. It will be apparent the apparatus may be applied to many uses other than the one exemplified. For example, it may be utilized by real estate agencies as a means for selecting available homes to suit the requirements of individual purchasers. It may be utilized also in the selection of merchandise and to a great variety of other uses which need not here be set forth. It will be apparent that for its intended use the degree of registration need not be mathematically accurate since the selection of employees, homes, and the like cannot be limited to those which correspond absolutely with the desired qualifications. In other words, the apparatus is adapted to provide a somewhat flexible system, which indicates a reasonable degree of duplication between the qualifications desired and those of the record film.

Equipped with regulating means which permits the degree of correlation between the data strip and the master strip to be adjusted, the apparatus may be set for maximum or minimum sensitivity. Thus, for maximum correlation the complete registration of all of the apertures may be required, if this is desired or necessary. On the other hand, the apparatus may be regulated to require registration of a decreased degree, for example a 75% registration between the master and the record strip. With reference to the example previously given, it may be desired to call in a number of employees where the exact background or training is not required. In this instance the apparatus may be controlled or adjusted for a lower degree of sensitivity.

Referring to Figure 1 showing a preferred embodiment of the invention a film feeding apparatus is indicated generally at 10 a photo-electric unit at 11 and a recording camera or printing chamber at 12. The film or strip feeding apparatus incorporates a supply reel 14, upon which is carried the record film or strip indicated at 13 which passes from the supply reel to a scanning drum 15 through which passes a beam of light and upon which is mounted the master film 16. After passing around the scanning drum the film passes through the recording camera and eventually is rewound upon the lower takeup reel 17.

As hereinafter disclosed, the film, in passing around the scanning drum 15, overlies the master strip 16 in registry therewith so that the pattern of apertures of the master strip are in registry with the pattern of apertures of the record strip. The master strip is secured upon the drum in registry with a series of sprocket teeth 18 which teeth protrude through the master and record films as shown in Figures 2 and 3. The master strip is provided with apertures 19 or with transparent blocks in the same manner as the record strip, which is carried on the reels 14 and 17. If there is an equal number and corresponding relationship of apertures for each of the films then the beam of light indicated in broken lines on Figures 1, 2 and 14 will pass with maximum intensity through the superposed strips and will be projected to the photo-electric cell 20. When this condition prevails the apparatus electrically energizes a timing mechanism indicated generally at 21, see Figure 2. The timing apparatus is arranged to cause a printing operation to occur when the film reaches a position in the recording camera 12.

In the recording camera is disposed a printing lamp 22 which is caused to be illuminated to print the information of the record strip upon a sensitized photographic recording film indicated at 23. After passing through the camera 12, the film is rewound upon the takeup reel 17.

In addition to the recording of the matching frame of the record film, an apparatus is provided which automatically flashes upon a screen the particular film frame which meets the requirements of the master film. This apparatus is indicated generally at 25 and includes an angular reflector 26 operated by solenoid 27, which causes the reflector to be interposed in the light beam as shown in dotted lines on Figure 2. When the reflector 26 is in position as shown, the light beam is directed at right angles to a projector lens assembly 28 from which the beam is projected upon a screen 29.

More specifically described, the film feed or projector mechanism 10, as shown in Figures 1 and 2, is driven by an electric motor indicated at 30 connected by a belt 31 to a transmission unit 32. The transmission unit incorporates a suitable intermittent feed mechanism preferably in the form of a crank arm 33, cooperating with a star wheel 34. The arm 33 engages with the star wheel 34 mounted upon a shaft 35 which carries the scanning drum 15.

As shown in Figure 2, the scanning drum 15 is in the form of a cylindrical element formed of transparent material such as Lucite, or a similar plastic composition. One end of the drum is open to receive the light beam from a source of light 37. The light source includes a suitable projecting lens assembly 38 of standard design to project a parallel light beam. A reflecting mirror or prism 39 causes the light beam to be deflected at right angles to its source so as to cause it to pass through the master and record films carried on the scanning drum. As shown, the beam of light passes from the drum to the photocell 20.

As shown in Figures 7 and 8 the intermittent gear assembly causes a step by step film feed. This motion is transmitted to the lower takeup drum 44a by means of a sprocket and chain arrangement (Figures 1 and 2). Sprocket 41 is mounted upon the shaft 35 along side of the star wheel 34 and carries upon it a sprocket chain 42. The takeup mechanism includes a sprocket 43 keyed or pinned upon a shaft 44 and the toothed takeup drum 44a also is carried upon the shaft 44. This arrangement causes the film to be fed intermittently through the recording camera 12 in a manner similar to that of a motion picture projector. The transmission unit 32 further includes a pulley 46 upon which is engaged a flexible belt 47. This belt passes around a similar pulley 48 secured to the shaft of the takeup reel 17 thereby taking up the slack as the film is passed through the camera.

The timing device 21 which actuates the recording camera 12 is mounted as shown in Figures 2, 10 and 11 upon the outer end of shaft 35. The timer comprises a pair of discs or plates 50 having engaged therein a series of time pins 51. These pins are slidably engaged in apertures drilled through the plates 50 and which carry the pins parallel with shaft 35. An electromagnet 53 is mounted adjacent the end of the timer and is arranged to slide the pin or pins to an extended switch actuating position when the magnet is energized. For this purpose the timer assembly includes a switch 54 having an actuating arm 55.

As shown in Figure 11, the switch arm is arranged to be intercepted by the timer pin 51, which is in its extended position, while those in normal retracted position rotate past the switch arm without contacting it. This causes actuation of the control system as hereinafter disclosed.

As shown in Figures 11 and 13 a skid or inclined cam 56 is mounted upon the electro-magnet slightly in advance of the armature 57 of the magnet. This causes the pin to be reset in its retracted position after having tripped the timer switch 54.

The timer operates in the following manner. When a record frame matches sufficiently the master frame, the light rays or beam energizes the photo-electric cell causing the electro-magnet 53 to be energized. The electrical circuit which causes the electro-magnet to be energized will be described more fully hereinafter. The purpose of the timer is to cause the recording camera to be actuated after a proper time interval.

It will be noted that the recording camera is located below the scanning drum. Therefore, in order to photograph the frame which previously energized the photocell, it is necessary that the camera be actuated when the previously matched data frame reaches a printing position in the camera. For this purpose an adjustable arm 59 having a roller 59a is provided to adjust the slack in the film for accurate registry in the camera. In the present instance the recording film is located from the scanning drum a distance equal to seven frames of the record film. Therefore, it is necessary to delay printing of this frame until seven additional frames have passed over the scanning drum, at which time the matched frame has advanced to printing position in the camera.

The timer is provided with, by way of example, eight timer pins 51. When the photoelectric system is energized by registration of the record film the electro-magnet 53 immediately is energized to set the camera for operation by magnetically pulling one of the timer pins to a switch operating position as shown in Figure 12. When operation of the machine is resumed, rotation of the scanning drum and timer eventually brings this extended pin into a position for actuating switch 54 as shown in Figures 10 and 11. The distance advanced by the pin represents the distance advanced by the matched data frame. Therefore, when the switch 54 is actuated by the pin, the previously scanned frame which initiated the operation is in position in the recording camera for printing. When the switch is actuated the printing lamp 22 of the camera is lighted for a predetermined interval to print the image of data film upon the recording film 23.

As shown in Figure 13, the cam or skid 56 causes the pin to be reset before it again reaches its position in front of the electromagnet 53. Since there is a timer pin for each film frame the apparatus is positive in its operation and there is no possibility for the timer to become out of step with the frame of the record film. Any number or order of frames may actuate the timer or it is possible for a continuous series of frames of the record strip to match and cause printing of the entire series. After the entire reel of record film has been run through the apparatus, the camera may be opened and the exposed film strip 23 removed and developed thus giving the results of the selection as a permanent record.

Referring to Figures 3 and 4, the camera 12 comprises a housing 60 in which is mounted the lamp 22 and includes a film housing 61 in which is exposed the recording film 23. Housing 61 is detachably secured to housing 60 in order to permit the film to be removed therefrom. The film is carried upon a pair of upper and lower rollers carried upon shafts 62—62 the lower one of which is a takeup roll while the upper is a supply roll. The housing 60 is provided with an opening 63 communicating with the film chamber 61. The printing film 23 is engaged against the data film as shown in Figure 3, by means of a shoe or saddle 65, the record film being superimposed upon the printing or photographic film 23 so as to print the image thereon when the printing lamp is illuminated.

The takeup or lower reel 67 includes a mechanism which causes the film to be advanced each time the lamp 23 is illuminated. This apparatus comprises a pinion gear 66 secured on a shaft 62 upon which shaft is mounted the takeup roller 67. A rack 68 meshes with the pinion 66. The upper end of the rack 68 is pivotally secured upon a link 69 and the opposite end of the link 69 is pivotally connected to a lever 70. The opposite end of the lever 70 is connected by means of link 71 to the armature 72 of a solenoid 73.

Pinion gear 66 is connected to shaft 62 by means of an overrunning clutch 74 as shown in Figure 6. When the solenoid is energized the lever swings into a position indicated in dot-dash line causing the rack 68 to rotate the pinion 66 in a right hand direction. This causes the overrunning spring type clutch to engage the shaft 62 to rotate roller 67 in the direction indicated by the arrow on Figure 3. A feed movement of the recording film 23 sufficient to present an unexposed portion of the film for exposure is thus obtained. After the printing operation the solenoid is de-energized causing the rack to return to its normal position through operation of the tension spring 75. On the return stroke of the rack the overrunning clutch operates in its idling direction thereby preventing rotation of roller 67 in the reverse direction.

From the foregoing it will be observed that each time the apparatus encounters a matching data frame the matching frame subsequently will be printed when it reaches the recording camera and also that each time a film frame is recorded in the camera an unexposed portion of the recording film is advanced automatically for printing.

As previously noted, the record film may carry a file number such as illustrated in Figures 14 and 15, or it may carry directly the required information as shown in Figure 4. As shown in Figure 4 the opening 63 of the camera may be sufficiently large to permit the entire frame to be printed, however, this is not essential.

The recording camera is regulated and timed by means of an exposure timer which is incorporated in the control circuit as hereinafter described. The timer controls the interval during which the printing lamp 22 is illuminated, and after the printing interval the timer re-establishes the circuit to the motor 30 to energize the motor and restart the operation of the apparatus. After passing through the recording camera, the record film 13 passes to the rewind reel 17.

In order to prevent passage of light between frames in the feed motion of the data film, the projector may be provided with a rotary shutter 76 mounted upon shaft 77. Shaft 77 is driven by shaft 78 of the transmission unit 32. Shaft 78 is connected to shaft 77 through suitable bevel gears (not shown) to synchronize rotation of the shutter with the film feed. The shutter structure may follow any preferred design similar to that employed in motion picture projectors and for this reason is not disclosed in detail. If the data strip is printed in the negative, i. e. of opaque material, with transparent or punched apertures the shutter may be omitted.

As shown in Figure 16, the apparatus is controlled automatically by an electrical control circuit. This circuit is intended to illustrate a simplified arrangement for controlling automatically the operation of the apparatus and for this reason it is described and illustrated in a generalized manner. As illustrated, the circuit is interconnected with the photocell unit 11, which is energized by power line 81 and 81$a$ connected to a suitable source of power to energize the photocell circuit and control circuit. Since the photocell unit and circuit may follow any commercial design it is not illustrated in detail. The photocell circuit is connected with the electrical circuit by means of control lines 82 which lead to the winding of a solenoid 83.

It will be apparent that the solenoid will be energized when the photocell is energized by a beam of light of proper intensity, for example under the conditions shown in Figure 14. When solenoid 83 is energized it closes the contacts 84 thereby connecting the line 85 leading from power line 81 to the screen solenoid 27. The circuit passes through the winding of solenoid 27 to the windings of the electromagnet 53, thereby withdrawing into actuating position one of the timer pins 51 as previously described. After passing through the winding of the electromagnet 53 the line 85 joins a branch line 85$a$ which is in connection with the opposite side 81$a$ of the power circuit.

It will be observed that when the screen solenoid is energized it operates the reflector 26 as shown in Figure 2, to project the image of the matching film frame upon the screen 29. This, of course, permits the operator to note down immediately the information projected on the screen from the matching frame.

Also, it will be observed that when the solenoid 83 is energized to close the contacts 84, the contacts 88 of relay 83 are opened. When contacts 88 are opened, drive motor 30 is de-energized and stopped immediately by means of an automatic brake forming part of the motor, thus stopping rotation of the scanning drum with the matching frame in position for projection on the screen. The motor 30 is energized through line 89 through switch contacts 88 to switch contacts 91 controlled by relay 90 to the motor, the opposite side of the circuit being completed by means of line 92 connected to power line 81.

After having been energized by a matching film frame to stop the motor 30, the apparatus will remain stationary until it is restarted manually. The circuit is arranged in this manner to permit the operator to take down the information projected upon the screen 29. For this purpose the circuit includes a manually operated normally open start button indicated at 93. The contacts 94 of button 93 are connected in series in a branch line 95 which bypasses contacts 88 and 91 of solenoids 83 and 90 of control line 89. Therefore, when the start button 93 is depressed the circuit to the motor is re-established from power line 81$a$ through the lines 85$a$, 89 and 95 to the motor. The motor thereupon is restarted and the automatic operation of the apparatus is resumed.

Assuming that no matching frames are encountered, the apparatus operates continuously, intermittently matching the record and master frames. If a matching frame is encountered a pin 51 of timer 21 is withdrawn and rotates intermittently a distance correlated with the advance of the frame. In other words, as each frame advances, any previously actuated switch pin 51 will advance a corresponding distance in its orbit. As previously stated, the center to center distance between the pins is correlated to the center to center distance of the film frames. Therefore, when the film frame which previously matched the master frame and energized the control circuit reaches the camera opening 63, the timer will have advanced the corresponding timer pin 51 a sufficient distance to actuate the switch arm 55 previously described and forming a part of the timer unit 21.

As the matching frame reaches its position in the camera opening the switch 54 will be tripped by switch pin 51. This energizes line 97 leading from power line 81 through the contacts of switch 54, through winding 100 of the exposure timer 89. From the opposite end of this winding 100 the circuit is completed through branch line 85*a* to the opposite power line 81*a*. This sets the exposure timer in operation.

As the timer rotates the circuit is energized to halt operation of motor 30, to illuminate this printing lamp 22 for a timed interval and to actuate the sensitized feed solenond 73. For this purpose line 97 leading from power line 81 is energized through line 102 through stationary contact 103 of the exposure timer and to line 104 through rotary contact 105 of the timer. Line 104 leads to one side of lamp 22 and the circuit through the lamp is completed through line 85*a* to power line 81*a*. From line 104 a branch line 101 extends to the winding of relay 90 and the opposite end of this winding is connected by line 107 extending to the winding of the sensitized paper feed solenoid 73. The opposite side of this winding is connected to line 85*a* thus completing the circuit to power line 81*a*.

Upon being actuated, the exposure timer 98 holds the circuit energized for a sufficient period of time to illuminate lamp 22 to properly expose the sensitized paper to the record film and to hold relay 90 in open position holding motor 30 stationary. After this interval the timer opens the circuit to line 104 to de-energize the solenoid switch 90 and thereby re-establish the circuit to the motor 30. The apparatus then resumes operation automatically, until it is again interrupted by at matching film frame.

The timer 98, the several solenoid units and relay switches may follow any commercial design and for this reason are not described in detail. As shown, the timer makes one rotation in the direction shown and the contact 103 may be shifted relative to the rotary contact in order to regulate the exposure period. Likewise, the photocell unit 1 may incorporate a control circuit designed according to the prevailing practice and operating at prescribed voltages.

The degree of coincidence necessary as a minimum threshold value for operating the comparator may be controlled electrically by means of suitable variable resistors incorporated in the photocell circuit in the customary manner. Also, the sensitivity may be controlled by means of the variable resistor 82*a* placed in the line 82.

As shown, in Figure 19, a regulating disc may be provided in order to control the amount of light passing to the photoelectric cell 20. The arrangement is indicated in Figs. 14 and 15, the disc being therein indicated as an unnumbered circle. Preferably, this disc is mounted by means of a U-shaped bracket 110 having journalled therein a control shaft 111. The disc 112 is carried upon this shaft directly in front of the lens of the photocell. The opposite end of shaft 111 preferably includes a control knob or dial 113. This dial, if desired, may be provided with suitable graduations in order to permit the operator to establish a predetermined reading or setting corresponding to the degree of light intensity desired.

Intensity is controlled or regulated by disc 112, which is provided with a variable light-density track 115 disposed in the path of the light beam. The disc includes a clear area 116 and the variable density track varies in degree from minimum to maximum around the circumference of the disc. As shown in Figure 19, the disc is set at the clear area 116 which corresponds to the minimum registration setting for the apparatus.

The track 115 is formed either by pigmentation or by rendering it partially opaque such as by frosting the surface of the disc. The disc is preferably formed from glass or a clear plastic material and the light reduction surface may be formed in a manner that is suited to the material.

Thus, by proper regulation of the control disc 112 the intensity of the light beam reaching the photoelectric cell may be regulated. This in turn effects the sensitivity of the apparatus. By way of example, when the disc is adjusted to a position for maximum density or minimum light passage a minimum amount of light will reach the photoelectric cell. Therefore, in this adjustment a maximum registration of the record frame with the master frame is necessary to cause actuation of the control circuit. Conversely the amount of registration required to energize the circuit decreases as the density of track 115 decreases.

This arrangement permits the operator to select the desired degree of registration depending upon the particular class of work to which the apparatus is applied. The adjustable disc, therefore, adapts the machine to a wider variety of work than would otherwise be practical.

As shown in Figures 17 and 18, the scanning apparatus may be modified from that shown in Figure 1. In this event, the same general operating principles apply and the apparatus is interconnected with a suitable control circuit as previously described.

In the form shown in Figure 17, the scanning drum 15 is eliminated. In this arrangement the apparatus incorporates a transparent plate 120 on which is mounted a single master film frame 121. A transparent shoe 122 is provided on the opposite side of the plate 120. This shoe is arranged to press the record film against the master film 121. The arrangement further provides suitable feed mechanism as previously described to intermittently feed the record film relative to the master film. It will be noticed that in the form illustrated in Figure 17, a single frame of film may be utilized instead of a series of identical master film frames as utilized in the form shown in Figure 1.

In the arrangement shown in Figure 18, an endless loop of master film is utilized in place of the circular band utilized in the preferred form of the invention. In this instance the master band 124 is carried upon an intermittently driven feed drum 125 having sprocket teeth similar to the drum shown in Figure 3. The sprocket teeth engage simultaneously the apertures of the master film and record film so as to insure that the films are properly in registry as they pass the light source. An advantage in the arrangement of Figure 18 resides in the fact that the light ray may pass through the superposed film frames directly rather than through a transparent drum as previously described. The organization as illustrated in Figure 18 interconnects with suitable control apparatus as previously disclosed and operates in a manner similar to that of the preferred form of the invention.

Having described our invention we claim:

1. An apparatus for selecting data from a record strip having apertured frames by passing a light beam through said strip and through a master data strip in superposed relationship having a series of identical apertured masking frames comprising; means for retaining a reel of record strip to be fed through the apparatus, a transparent feed drum the master data strip being mounted upon the periphery of said drum, the drum being arranged to feed the record strip in superposed relationship and in registry with the master strip, means for rotating said feed drum intermittently, a source of light arranged to pass a beam of light through said drum for passage through said superposed record and master strips, a photoelectric unit, a control circuit connected to said unit, said unit adapted to be energized by light rays passing through the registering apertures of said master and record strips, a movably mounted reflector arranged to intercept the beam of light, means actuated by said control circuit to position said reflector in intercepting position when said photoelectric unit is energized, a lens system and a viewing screen, said lens system arranged to receive the light from the reflector when the latter is in intercepting position and thereby to project the image of the registered frame upon the screen.

2. An apparatus for selecting data from a record strip having apertured frames by passing a light beam through said strip and through a master strip in superposed relationship having a series of identical apertured masking frames comprising; means for retaining a reel of record strip to be fed through the apparatus, a transparent feed drum the master strip being mounted upon the periphery of the drum, the drum being constructed and arranged to feed the record strip in superposed relationship and in registry with the master strip, means for rotating said feed drum intermittently, a light source arranged to pass a beam of light through said drum for passage through said superposed record and master strips, a photoelectric unit, a control circuit connected to said unit, said unit adapted to be energized by light rays passing through the registering apertures of said master and record strips, a timer including a rotatable pin-carrying plate switch, said switch being arranged to be actuated by said photoelectric cell, a solenoid in the cell circuit arranged to act selectively upon the pins of the pin-carrying plate switch a printing device arranged to print the registered record frame, said timer being arranged to actuate said printing device when said previously recorded film frame subsequently is positioned in said printing device, and means for rewinding the data strip after passage through said printing device.

3. An apparatus for selecting data from a record strip having apertured frames by passing a light beam through said strip and through a master strip in superposed relationship having a series of identical apertured masking frames comprising; a transparent feed drum the said master strip being mounted upon the periphery of said drum, the drum being constructed and arranged to feed the record strip in registry therewith, means for rotating said feed drum intermittently, a source of light arranged to direct a beam of light endwise into said drum, an angular reflector arranged to reflect the beam through the wall of said drum for passage through said superposed record and master strips, a photoelectric device, a control circuit connected to said device, said photoelectric device adapted to be energized by the light beam passing through the apertures of said record and master strip in registry, a viewing screen, an angular reflector arranged to be interposed in the path of the light beam between said protoelectric device and said transparent feed drum, and actuating device interconnected with said control circuit to interpose said angular reflector to project the matching record frame upon said screen when the record apertures match the master apertures sufficiently to energize said photoelectric device and control circuit.

4. An apparatus for selecting data from a record strip having apertured frames by passing a light beam through said strip and through a master strip in superposed relationship having a series of identical apertured masking frames comprising; a transpareent feed drum the master strip being mounted upon the periphery of said drum, the drum being arranged to feed the record strip in registry therewith, means for rotating said feed drum intermittently, means for passing the beam of light through said drum for passage through said superposed data and master strips, a photoelectric device, a control circuit connected to said device, said photoelectric device adapted to be energized by light rays passing through the apertures of said record and master strip when the same are in registry, a timer arranged to be actuated by said photoelectric cell, a printing device arranged to photographically print a registered data frame, the printing device being constructed and arranged to receive the advancing record strip from the feed drum and to pass the strip through the printing device said timer being in electrical connection with the printing device and constructed and arranged to actuate said printing device when said previously registered record frame is positioned in said printing device, and a device for feeding a sensitized printing strip length through said printing device each time said printing device is actuated.

5. An apparatus for selecting data from a record strip having apertured frames by passing a light beam through a master strip in superposed relationship having a series of identical masking frames comprising, a transparent feed drum the master strip being mounted upon the periphery of said drum, driving means for rotating said feed drum, said feed drum having teeth arranged for engagement with duplicate feed apertures in the master and record strips to align the same, a light source, said feed drum having an open end arranged to receive a beam of light from said light source, an angular reflecting element disposed in the feed drum and arranged to direct said beam of light angularly through the transparent wall of the feed drum and through the registering apertures of the superposed master and record frame apertures, and a photoelectric device arranged to register when a predetermined degree of concidence exists between the master and record apertures.

ROBERT F. BADGLEY.
WILLIAM A. WILKEN.
CHESTER TIETIG.

(References on following page)

REFERENCES CITED

The following references are of record in the file of this patent:

UNITED STATES PATENTS

| Number | Name | Date |
|---|---|---|
| 1,834,405 | Kosken | Dec. 1, 1931 |
| 1,954,338 | Tuttle | Apr. 10, 1934 |
| 1,973,470 | Denis | Sept. 11, 1934 |
| 2,002,151 | Maurer | May 21, 1935 |
| 2,121,061 | Townsend | June 21, 1938 |
| 2,140,567 | Townsend | Dec. 20, 1938 |
| 2,172,330 | Bryce | Sept. 5, 1939 |
| 2,209,342 | Longhridge | July 30, 1940 |
| 2,251,998 | Goodale | Aug. 12, 1941 |
| 2,323,372 | Bryce | July 6, 1943 |
| 2,329,919 | Longhridge | Sept. 21, 1943 |

FOREIGN PATENTS

| Number | Country | Date |
|---|---|---|
| 714,205 | Germany | Nov. 24, 1941 |